United States Patent [19]

Vaerewyck et al.

[11] 4,211,922
[45] Jul. 8, 1980

[54] HELIOSTAT GUIDANCE

[75] Inventors: Eugene G. Vaerewyck, Murrysville; Robert C. Miller, Penn Hills; Arthur E. Anderson, Murrysville, all of Pa.

[73] Assignee: Westinghouse Electric Corp., Pittsburgh, Pa.

[21] Appl. No.: 956,778

[22] Filed: Nov. 1, 1978

[51] Int. Cl.² ............................................. G01J 1/20
[52] U.S. Cl. .............................. 250/203 R; 126/425; 356/152
[58] Field of Search ................. 250/203 R; 126/424, 126/425; 356/141, 152

[56] References Cited

U.S. PATENT DOCUMENTS

| 2,712,772 | 7/1955 | Trombe | 250/203 R X |
| 3,986,021 | 10/1976 | Hitchcock | 250/203 R |
| 4,013,885 | 3/1977 | Blitz | 250/203 R |
| 4,041,307 | 8/1977 | Napoli et al. | 250/203 R |
| 4,063,543 | 12/1977 | Hedger | 250/203 R X |
| 4,146,784 | 3/1979 | Yekutieli | 250/203 R |

OTHER PUBLICATIONS

"Developed with Private Funds Sun Trac's Patented 2-Axis Tracker now in Limited Production", Electronic Journal, Sep.-Oct. 1977, p. 12 Author unknown.

Primary Examiner—David C. Nelms
Assistant Examiner—Edward P. Westin
Attorney, Agent, or Firm—Edward L. Levine

[57] ABSTRACT

Apparatus for positioning a mirror to reflect solar radiation from the sun onto a remote receiver. Two wide angle, preferably cylindrical lenses are positioned through the mirror, parallel to the reflective face of the mirror, with their optical axes at ninety degrees respectively corresponding to elevation and azimuth. Multi-element photosensors are rigidly affixed behind the mirror so that images of the sun and the receiver can be focused on the sensors. The sensors extend a length equivalent to the field of view through the respective lens encompassing the sun and receiver during the daily and seasonal apparent path of the sun. A selected element of each photosensor is positioned along a line representing the normal to the mirror surface through its corresponding lens. Electrical circuitry and drive apparatus utilize the signals from the photosensors representative of the images of the sun and receiver, and the distance of each image from the selected element, to position the mirror to reflect solar radiation onto the receiver. The mirror is properly oriented where the images are equidistant from the selected element representing the normal. The image of the receiver can be formed by radiation reflected from the receiver back toward the mirror or by additional apparatus such as a steady or pulsed light source.

6 Claims, 8 Drawing Figures

HELIOSTAT GUIDANCE

BACKGROUND OF THE DISCLOSURE

1. Field of the Invention

This invention relates to heliostats which track the apparent motion of the sun to focus radiant solar energy upon a remote receiver, and more particularly provides apparatus for properly aiming the heliostat.

2. Description of the Prior Art

Increasing energy concerns have focused substantial attention upon new systems for harnessing solar energy. Typical of proposed central-station solar power plants are those which rely on large arrays of mirrors for concentration of solar energy upon a remote receiver. For example, in a 100 megawatt-electrical solar power plant the outermost mirrors can be 3,500 to 4,000 feet from the receiver and there can be about 40,000 mirror assemblies, each of 40 square meters, in the mirror field.

In order to obtain an efficient useful energy production with such systems, it is of maximum importance that each mirror assembly be properly oriented throughout the period of the sun's daily and seasonal availability to properly focus incident radiation upon the receiver. The accuracy of this tracking should be in the range of milliradians in both azimuthal and elevational directions in order to take maximum advantage of the sun's energy.

Two basic methods for heliostat guidance exist. The first is a time-oriented clock-controlled drive system. Such systems cannot provide the required accuracy for each individual mirror assembly, particularly when it is recognized that environmental effects such as ground settling about the mirrors and the receiver, and wind loading particularly of the receiver, typically several hundred feet high, are not adjusted by a timed system. The second method, which can be combined with a timed system, involves some means for sensing the positions of the sun and the receiver or target, and adjusting the position of the heliostat to best focus the sun's radiation from the mirror to the receiver. An example of this type of system is provided in U.S. Pat. No. 4,013,885 which provides a mirror with a central aperture or lens through which radiation from the sun and infrared radiation from the receiver pass. Through use of a light dispersive hemisphere, a second back mirror and other components, images of the sun and receiver are formed on a detector and the mirror is aimed by aligning these images such that they are coincident on the detector. While the system offers substantial advantages and accuracy, it presents some characteristics which can be improved upon such as numerous components and reliance upon infrared energy from the receiver which may not always be available, such as under cloud cover or initial daily start-up. Further, it is unclear how the system would respond when the sun, receiver and mirror aperture are all aligned, as well as the effect of the high energy radiation and corresponding temperatures upon the reliability of various system components.

Accordingly, it is desirable to provide a heliostat aiming system which provides the required accuracy with a minimum amount of components, which is of a high reliability, and which maximizes the reflected solar radiation during varying sun positions and environmental conditions.

SUMMARY OF THE INVENTION

This invention provides a heliostat aiming system which accurately tracks the apparent motion of the sun to focus solar radiation upon a remote receiver. The system utilizes a minimum number of high reliability components and is based upon the principle of pointing the normal to the heliostat surface so that the angle formed by a line between the sun and the mirror and a line representing the normal is equal to the angle formed by the normal and a line between the mirror and the center of the receiver. When this relationship is maintained in both an azimuthal and elevational orientation, the solar radiation incident upon the mirror will be reflected upon the receiver.

The system includes placing two wide angle, line image producing lenses in an aperture in the mirror, parallel to the reflective front surface of the mirror. The lenses are oriented with their axes, and optical axes, at ninety degrees to one another corresponding to elevation and azimuth or, in other terms, one lens is horizontal under all mirror orientations and the other is "vertical". Rigidly mounted to and behind the mirror are two sets of linear photosensors, each set corresponding to a respective one of the lenses. The photosensors accordingly are parallel to the mirror reflective surface and form a cross behind the mirror. Alternatively a rectangular photosensor grid can be utilized. The photosensors extend in length over the field of view of the productive angles encompassing both the sun and receiver through the lenses.

The photosensors provide an indication of the distance of the image of the sun and of the receiver from a preselected, typically central point on the photosensor. It the images are equidistant from the central point, which point represents the normal to the mirror reflective surface through the center of the corresponding lens, the mirror is properly aligned and the sun's radiation will be reflected onto the receiver. If the images are unequal distances from the central point, the mirror is improperly oriented and a correction can be made through well-known circuit and drive means. These means also can properly orient the mirror when both images lie on the same side of the central point, for example during startup or gross misorientation of the system, by sensing that no image exists on one side of the photosensor and beginning a search, thereby reorienting the mirror, until images exist on both sides of the central point.

The system can properly track the sun through a large portion of a daily cycle if lenses having a wide field of view are utilized. While the image of the sun is created directly by the sun, the image representative of the receiver can be created in a variety of manners including a bright or highly reflective spot in the center of the receiver which otherwise is substantially non-reflective. It can also be created by a high intensity steady or pulsed light source such as a xenon flash lamp.

BRIEF DESCRIPTION OF THE DRAWINGS

The advantages, nature and additional features of the invention will become more apparent from the following description, taken in connection with the accompanying drawings, in which.

DESCRIPTION OF THE PREFERRED EMBODIMENTS

Figure 1:
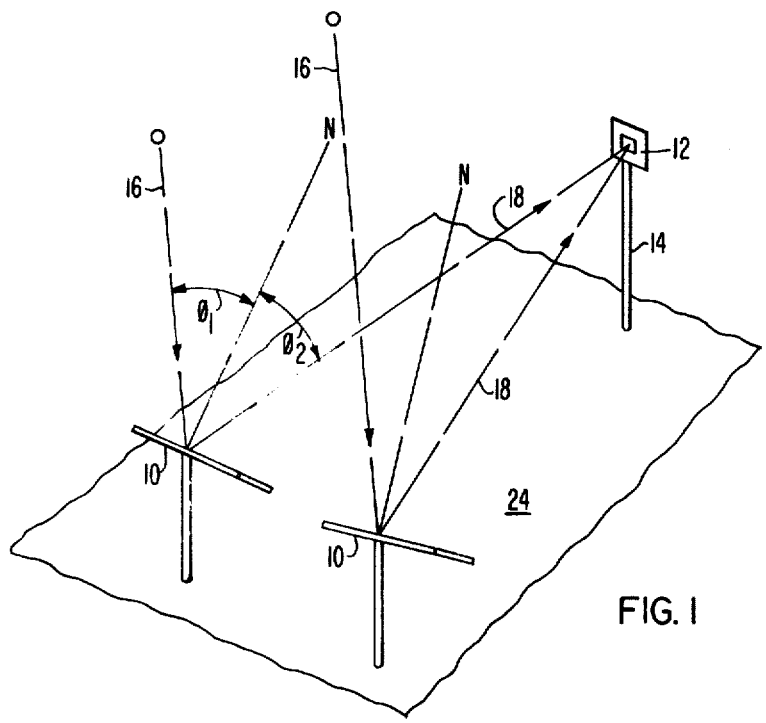
FIG. 1 is a simplified schematic of a solar power installation.

Referring now to FIG. 1 there is shown a simplified illustration of a solar power station which includes a plurality of substantially flat reflective mirrors or heliostats 10 surrounding a receiver 12 mounted atop a support 14. Solar radiation 16 incident upon the mirrors 10 is reflected 18 to the receiver where the energy is utilized such as through heating of a vaporizable fluid circulating through the receiver and a prime mover.

Figure 2:
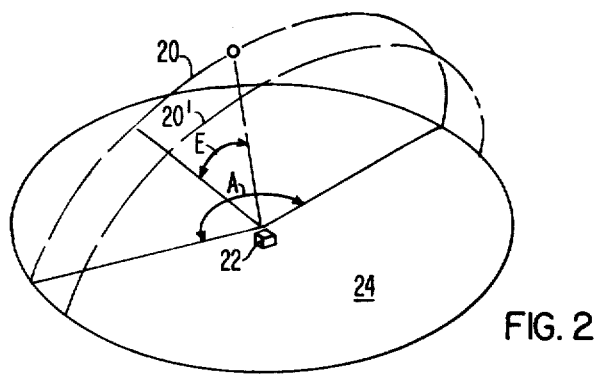
FIG. 2 is a schematic of the apparent motion of the sun relative to a ground position.

FIG. 2 illustrates the apparent path 20 of the sun during a day, relative to the location 22 of a solar station on the ground 24. The angle denoted E represents one of a continuous number of elevation angles the sun traverses, relative to the ground-mounted station, during a day. For a typical United States location, a +32° latitude, the elevational variation of the heliostat 10 to maintain both the sun and receiver within an optical field of view is roughly one radian. The angle denoted A represents, for the same position, the field of view required during a day in the azimuthal direction and can be shown to be roughly two radians. Additionally shown in the Figure is the apparent daily path 20' of the sun during another season. From FIGS. 1 and 2 it can therefore be seen that proper tracking of the sun and orientation of a mirror 10 is dependent upon such factors as the azimuthal and elevational position of the sun relative to the mirror 10 at a given instant, as well as the distance of the mirror from the receiver, and that the required azimuthal field of view is greater than the elevational field of view.

Figure 3:
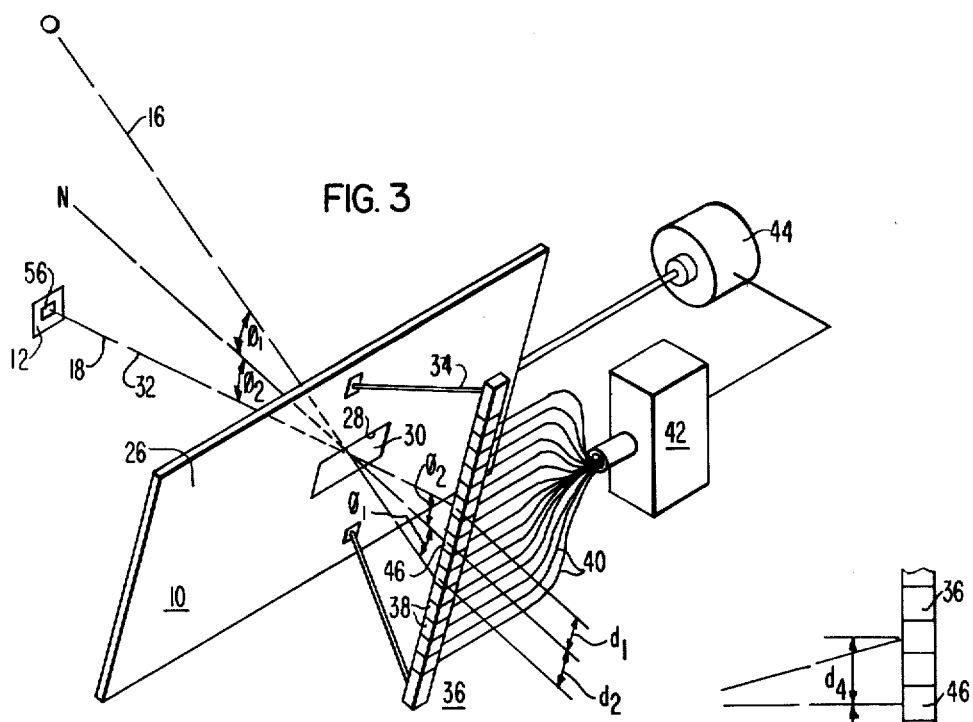
FIGS. 3, 5 and 6 are perspective views of heliostat aiming systems in accordance with the invention.
Figure 4:
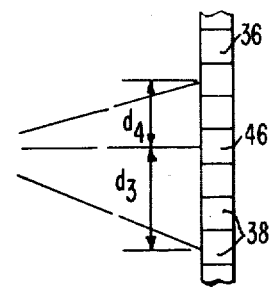
FIG. 4 is an elevational view of a photosensor in accordance with the invention.
Figure 4A:
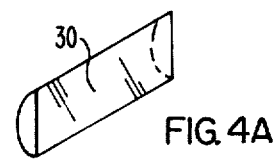
FIG. 4A is a perspective view of a lens in accordance with the invention.

FIG. 3 shows a system in accordance with the invention for properly aligning the reflective front surface 26 of a heliostat 10 to direct incident solar radiation 16 to the receiver 12. The mirror is provided with an aperture 28 within which is disposed a lens 30 which focuses line images. The lens 30 preferably is a wide angle cylinder type lens as shown in FIG. 4A. For a flat mirror surface (FIG. 1), it can be shown that the angle between the incident radiation and the normal N to the mirror reflective surface 26, $\phi_1$, is equal to the angle between the normal N and the reflected radiation 18, $\phi_2$. Similarly, angles $\phi_1$ and $\phi_2$ behind the mirror 10 are equal. It will be noted that in FIG. 3 the line from the lens to the receiver 12 represents the direction of reflected radiation 18 as well as radiation 32 directed from the receiver toward the mirror 10 and lens 30, and presents the orientation where $\phi_1$ is equal to $\phi_2$. Disposed behind and rigidly affixed by supports 34 to the mirror, parallel to the mirror surface, is a linear photosensor 36 (FIGS. 3 and 4). The photosensor comprises a plurality of elements 38 which detect radiation focused upon them by the lens 30 and provide a corresponding electrical signal through leads 40 to an analyzer system 42 which signals a drive motor 44 to reposition the heliostat 10.

The photosensor 36 includes a preselected element such as central element 46 which is aligned with the lens 30 and accordingly represents the line of the normal to the mirror surface through the center of the lens 30. Thus, it will be recognized that the distance d between the central element 46 and the given elements upon which the line images representative of the sun or receiver are focused, is representative of the respective angle $\phi_1$ or $\phi_2$. Where, as shown in FIG. 3, the distances $d_1$ and $d_2$ are equal, the mirror is properly oriented with respect to elevation and no adjustment is necessary. Where, however, the distances $d_3$ and $d_4$ are not equal, the angles $\phi_1$ and $\phi_2$ are similarly not equal and the drive system responds to reorient the mirror and equalize the distances $d_3$ and $d_4$. The electrical circuitry represented by the analyzer system 42 to detect and reorient the mirror is well known in the art, and can include electronic processing such as peak or derivative detection to locate the center of the images produced. Many additional methods exist for electronically determining the physical distances of the images from the center of the sensor array which can also provide for the orientation where both images lie on the same side of the central element 46. For example, the element numbers of the images can be converted to binary numbers and subtracted to yield positive or negative error signals which are used to program the heliostat analyzer system 42 including provision of magnitude and sign error signals to a master control computer. Or, the element numbers of the images can be counted simultaneously from the central element and the error signal derived from the difference in count. In the event both images lie on the same side of the central element, such as during startup, the analyzer system can sense the absence of an image on one side and begin a search, thereby reorienting the mirror until images exist on both sides of the central element.

The length of the photosensor 36 is determined for any given geographic location so as to maintain the sun and receiver within its field of view through the lens 30 during a productive daily and annual cycle. It represents approximately a one radian field of view in the elevational direction.

Figure 5:
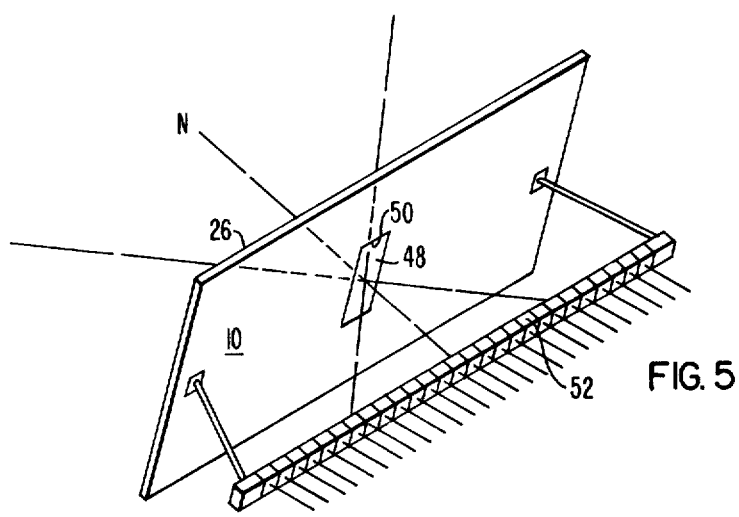
Figure 6:
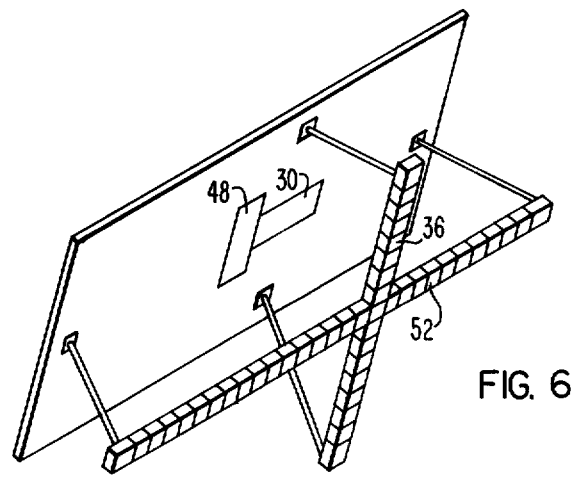

FIG. 5 shows a system similar to FIG. 3 which is utilized to properly aim the heliostat surface 26 with respect to azimuthal orientation. Here a line image producing lens 48 is disposed within an aperture 50 so as to focus images of the sun and receiver 12 upon a rigidly mounted linear photosensor 52. The system is similar to that of FIG. 3 except that the length of the azimuthal photosensor 52 would typically be greater than the length of the elevational photosensor 36 since a larger, approximately two radian, field of view through the lens 48 is required. While the field of view can be adjusted in other manners, such as by varying the f number of the lens, it is contemplated that two lenses, one for azimuth and one for elevation, will be utilized together and at a common distance from the lenses, as shown in FIG. 6. While dual lenses 30, 48, with perpendicular optical axes are preferably disposed in the geometric center of the mirror, they can be placed at other positions and the system adjusted accordingly. The two lenses, 30, 48 are preferably disposed so that azimuthal lens 48 is centered with respect to the mirror since it represents a larger field of view than the elevational lens 30. The individual azimuthal 52 and elevational 36 photosensors can also be replaced by a single rectangular grid of elements.

The photosensors 36, 52 can comprise any convenient number of elements 38. However, element size and focal length are somewhat restricted by the 0.0093 radian divergence of sunlight representing the size of the sun's appearance in the sky to a device on earth. For an exemplary desired aiming accuracy of three milliradians, this requires a linear photosensor with about 333 elements over the one radian elevational field of view. Accordingly, a photosensor 52 approximately 50 mm in length having 680 elements would accurately cover the two radian field of view for azimuthal orientation and a sensor 36 having approximately 340 elements over a 25 mm length would cover the one radian elevational field of view. It will be noted that this preferred arrangement of 13.6 elements per mm is substantially less than commercially available photosensors providing 81.9 elements per mm, and such readily available units can also be utilized. These parameters are compatible with a focal length for the cylinder lens of approximately 25 mm.

Figure 7:
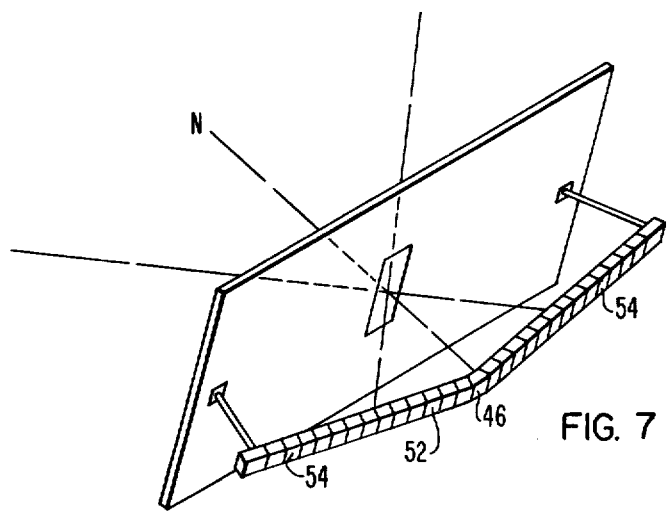
FIG. 7 is a perspective view of another heliostat aiming system.

As shown in FIG. 7, the photosensors, such as sensor 52, can also comprise an angled orientation with the junction point being central position or element 46. Here each leg 54 would be approximately half of the preferred length noted above. This split orientation is preferred since it provides a better image focus by maintaining more of the elements 38, particularly those at the periphery, at a distance from the lens closer to the actual focal length than an extended single photosensor.

While a cylindrical type lens 30, 48 is relatively easy and inexpensive to manufacture, other more complex configurations providing a wide angle and a line image can be utilized. An extremely large angle lens increases the field of view, and accordingly the period of time on a given day during which the system can properly track the sun and receiver.

Two images will be formed on each sensor, one for the sun and one for the receiver. It is preferable that the intensity of the images be of approximately the same magnitude, although it is not necessary. The image of the sun is dependent upon the intensity of the sun's radiation. The intensity of the receiver image can also be dependent upon the sun if the receiver 12 is provided with a highly reflected surface 56 (FIG. 3), preferably centrally located on the receiver. In this manner radiation from the sun is reflected from the heliostat 10 to the surface 56 and back to the lenses 30, 48. The receiver image can also be formed from independent means such as a high intensity steady or pulsed source, for example, a xenon flash lamp.

It will be apparent in view of the above that many modifications are possible without departing from the scope of the teaching.

I claim:

1. In a heliostat system wherein solar radiation is reflected from a mirror onto a receiver, apparatus for movably positioning the mirror comprising:
    (a) a line image producing lens disposed through said mirror;
    (b) a multi-element photosensor rigidly affixed behind said mirror disposed such that an image of the sun and an image of said receiver are focusable upon said photosensor, said photosensor having a preselected element disposed along the normal to said mirror through the center of said lens; and
    (c) means utilizing signals from said photosensor created by said images for positioning said mirror such that said images are predetermined distances from said preselected element.

2. The heliostat system of claim 1 wherein said predetermined distances are such that the image of the sun and the image of said receiver are equidistant from said preselected element.

3. The heliostat system of claim 1 wherein said image of said receiver is formed from a highly reflective portion of said receiver.

4. The heliostat system of claim 1 wherein said image of said receiver is formed from a light source mounted upon said receiver.

5. Apparatus for reflecting radiation from the sun to a remote receiver, comprising:
    (a) a substantially flat reflective mirror having an aperture therethrough;
    (b) an elevational cylindrical lens fixedly mounted in said aperture parallel to the surface of said mirror;
    (c) an azimuthal cylindrical lens mounted in said aperture so that its optical axis is perpendicular to the optical axis of said elevational lens;
    (d) a light source directed from the central region of said receiver towards said mirror and lenses;
    (e) a first multi-element photosensor fixedly attached to and behind said mirror and extending along the field of view of said sun and source through said elevational lens so that an image corresponding to said sun and an image corresponding to said source is focusable upon said first photosensor;
    (f) a second multi-element photosensor fixedly attached to and behind said mirror and extending along the field of view of said sun and source through said azimuthal lens so that an image corresponding to said sun and an image corresponding to said source is focusable upon said second photosensor; and
    (g) means for sensing the differential of the distance of said images on said first photosensor from a preselected position on said first photosensor and for sensing the differential of the distance of said images on said second photosensor and for adjusting the orientation of said mirror, affixed lenses and photosensors such that said differential approaches zero.

6. Apparatus of claim 5 wherein the length of said second photosensor is substantially twice the length of said first photosensor.

* * * * *